United States Patent [19]
Armbruster et al.

[11] Patent Number: 6,070,065
[45] Date of Patent: May 30, 2000

[54] CELL-BASED EMERGENCY CALL SYSTEMS AND METHODS

[75] Inventors: Peter Joseph Armbruster; Kenneth Lee Sowles, both of Chandler, Ariz.; Lawrence Walter White, Frederick, Md.

[73] Assignee: Motorola, Inc., Schaumburg, Ill.

[21] Appl. No.: 08/781,116

[22] Filed: Jan. 9, 1997

[51] Int. Cl.$^7$ .................................................. H04M 11/00
[52] U.S. Cl. ........................ 455/404; 455/432; 455/435; 455/521
[58] Field of Search ..................... 455/404, 521, 455/429, 432, 456, 433, 435, 428, 445; 379/37, 40, 39, 45

[56] References Cited

U.S. PATENT DOCUMENTS 5,555,286  9/1996  Tendler ................................. 455/404
5,602,901  2/1997  Redden et al. ........................ 455/404

*Primary Examiner*—Lee Nguyen
*Attorney, Agent, or Firm*—Harold C. McGurk; James E. Klekotka

[57] ABSTRACT

A satellite-based cellular communication system (100) is used to provide emergency services to subscriber units located anywhere on the earth. The surface of the earth is divided into defined areas and emergency codes are assigned to each one of the defined areas. As subscriber units (150) move relative to the surface of the earth, the satellite-based cellular communication system (100) updates the emergency codes stored in the subscriber units (150) as required based on the subscriber unit's current location. The subscriber unit (150) uses the stored emergency codes to determine when a user is requesting emergency services and prioritizes the call accordingly.

1 Claim, 4 Drawing Sheets

CELL-BASED EMERGENCY CALL SYSTEMS AND METHODS

FIELD OF THE INVENTION

The present invention pertains to communication systems and, more particularly, to a system and methods for handling emergency service requests in satellite communication systems.

BACKGROUND OF THE INVENTION

The need for requesting emergency services is common in communication systems. Commonly known, standard emergency numbers are helpful to eliminate caller confusion during emergency situations. When a user dials the standard emergency number (e.g., 911 in the United States), the telephone switch receiving the emergency call makes a decision as to where to route that call. In prior-art systems, the routing decision is based on the location of the fixed instrument from which the call is made. One problem with this system is that a user in an unfamiliar country may not know the proper standard emergency telephone number for that country.

Various countries throughout the world use different numbers to obtain emergency call services. As mobile subscribers roam between these countries, the subscriber units must generate the appropriate emergency number to the serving network, and identify the call attempt as an emergency call.

Some countries, such as Japan, employ more than one emergency number for emergency services. There are three emergency codes used in Japan. These are (110) for Police services, (118) for Fire services and (119) for Marine services. Cellular systems which support user mobility use a technique called Cell-Based Routing to route a call identified as an emergency call to the closest emergency center based on the cell in which the user is currently located. The subscriber unit must therefore recognize the dialed code as an emergency code to signal the serving network that this call is in the emergency category. In large cellular systems, such as satellite systems, the dialed emergency code is only valid for a particular area, and may need to be translated to another emergency number prior to being transmitted to the serving network. For example, the (110) code which is valid in Japan must be translated to a (911) code in the United States.

What are needed are methods and systems for determining emergency call routing in a satellite-based cellular communication system. What are further needed are methods and systems for determining emergency call routing in which a user may use different emergency numbers when located anywhere in the world.

DETAILED DESCRIPTION OF A PREFERRED EMBODIMENT

Figure 1:
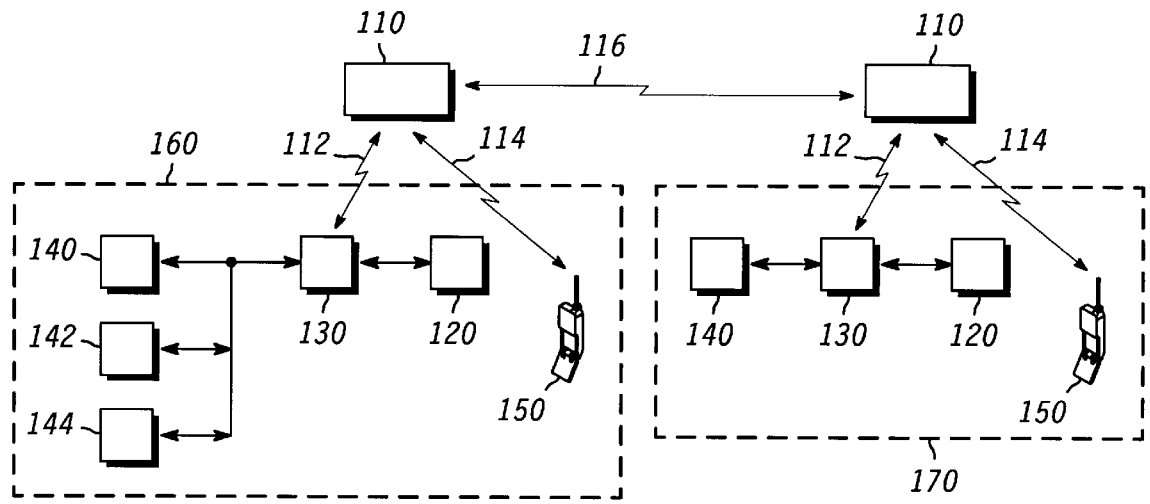
FIG. 1 shows a satellite-based cellular communication system in accordance with a preferred embodiment of the present invention.

The methods and systems of the present invention are used to determine emergency call routing in a satellite-based cellular communication system. The methods and systems of the present invention combine the use of current location data to provide location dependent information to subscribers and cell-based routing to do this.

The methods and systems of the present invention also provide a means for determining emergency call routing in which a user may use different emergency numbers when located anywhere in the world. This is accomplished by using the existing emergency dialing plans which differ from country to country.

The methods and systems of the present invention allow the subscriber unit to recognize dialed digits as an emergency code, translate the dialed digits to the appropriate digit stream based on location, and inform the servicing network of the emergency nature of the call attempt. To do this, the subscriber unit determines, based on its location, if the dialed digits represent an emergency call attempt. If so, the dialed digits are translated to the proper emergency code for that location, and an indication is sent to the network that this call is an emergency call.

In an exemplary system, each subscriber unit invokes a process referred to as Access as part of a Mobile Originated (MO) or Mobile Terminal (MT) call attempt. During this process, the Earth Terminal Controller (ETC) network determines the subscriber unit's current location. The subscriber unit provides the location of its last contact with the network, which may be different from its current location. In a preferred embodiment of the present invention, the ETC sends the subscriber unit the appropriate emergency number or numbers which are valid for the subscriber unit's current location.

The subscriber unit, upon recognizing the dialed digits as an emergency code, sends the network the appropriate emergency code for that servicing network, and marks the call attempt as an emergency call attempt. Upon recognizing the call attempt as an emergency, the network applies procedures specific to emergency calls. In an exemplary system, these procedures include the application of a higher granularity location determination. In addition, the network gives the call priority, routes the call to the proper emergency center, and, in the event all trunks to the emergency center are in use, retries until an idle trunk is available.

The method and systems of the present invention allow support of emergency calling service for subscribers roaming into areas where the emergency calling dialing plan differs from that of their home dialing plan. As an example, when a North American subscriber roams into Japan, the subscriber unit obtains the emergency codes for Japan. These are "110" for Police services, "118" for Fire services and "119" for Marine services. These emergency codes are transmitted to the subscriber unit when the subscriber unit registers with the new gateway. When this subscriber dials "110", the subscriber unit recognizes this digit string as an emergency call and sends the dialed digit string of "110" to the serving gateway (e.g., in Tokyo) marked as an emergency call. The serving network applies emergency call treatment to this call. If this marking process is not done, then the dialed digit string of "110" would still be sent to the serving network, but would not be marked as an emergency call. The call would therefore not receive emergency call treatment as specified above, but rather, the call would be treated as a normal call attempt.

FIG. 1 shows a satellite-based cellular communication system in accordance with a preferred embodiment of the present invention. Satellite-based cellular communication system 100 comprises subscriber units (SU) 150, communication satellites 110, earth terminals (ET) 120, gateways 130, emergency service centers (ESC) 140, 142, 144 and links 112, 114, 116. Subscriber units 150 communicate with emergency service centers 140 through satellites 110, earth terminals 120 and gateways 130. Subscriber units 150 communicate with satellites 110 over links 114. Satellites 110 communicate with gateways 130 using earth terminals 120 and links 112. A first geopolitical region 160 is shown. For example, this first region could be somewhere in Japan. A second geopolitical region 170 is shown. For example, this second region could be somewhere in the United States.

A subscriber unit's "home gateway" is defined herein as a gateway containing information relevant to a particular subscriber unit. A "visited gateway" is a gateway other than a subscriber unit's home gateway. For example, a user living in the Chicago area may have a home gateway within that area. For example, when the user travels to another area such as Japan, the user must communicate with a visited gateway.

In a preferred embodiment of the present invention, links 114 and links 112 utilize RF frequencies which accommodate substantially line-of-sight communication. Links 114 and links 112 encompass a limited portion of the electromagnetic spectrum that is divided into numerous channels. Links 114 and links 112 can encompass Frequency Division Multiple Access (FDMA) and/or Time Division Multiple Access (TDMA) and/or Code Division Multiple Access (CDMA) communications or combinations thereof. Links 114 and links 112 are shown as bi-directional links. Those skilled in the art will recognize that any of the links can be either uni-directional or bi-directional.

According to the methods and systems of the present invention, a user's location may be determined based on which cell the subscriber unit is located in at a particular time. In this way, the earth's surface is divided into defined areas, and the subscriber unit can be located within a defined area. Alternatively, a user's location can be determined based on geolocation information such as latitude/longitude or other representation. As defined herein, a "location area code" (LAC) is a code number which identifies a particular location area. For example, this could be an area of a relatively small size having known boundaries. The present invention associates each LAC with at least one emergency service center if the geopolitical region within which the LAC is located provides emergency services. Alternatively, a service provider can independently provide emergency services. In addition, the present invention associates each LAC with at least one emergency service code if emergency services are provided in the geopolitical region within which the LAC is located.

Figure 2:
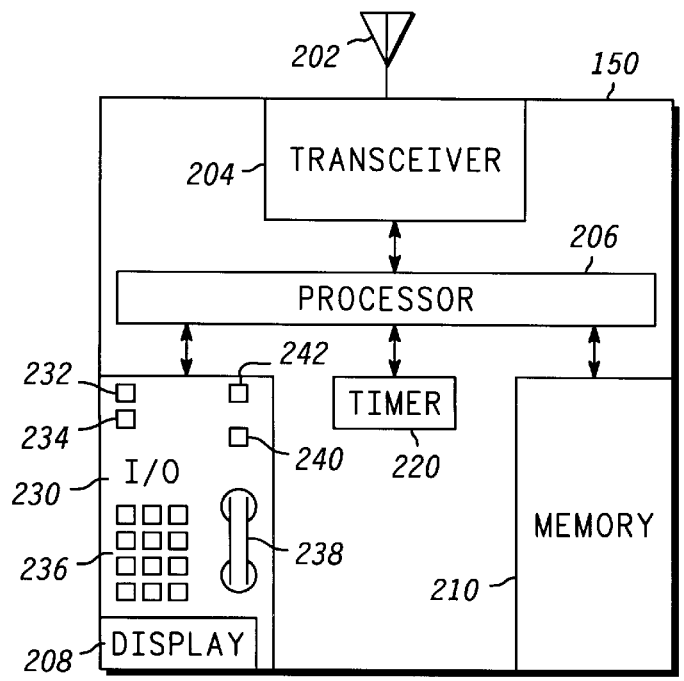
FIG. 2 shows a block diagram of a subscriber unit in accordance with a preferred embodiment of the present invention.

FIG. 2 shows a block diagram of a subscriber unit in accordance with a preferred embodiment of the present invention. Subscriber unit 150 comprises antenna 202, transceiver 204, processor 206, display 208, memory 210, timer 220, I/0 section 230, hook switch 232, audio alert 234, keypad 236, handset 238, send key 240, and power switch 242. Subscriber units 150 can communicate with other subscriber units 150, and emergency service Centers 140. Transceiver 204 transmits and receives signals to and from satellites 110 using antenna 202. It should be understood that while each subscriber unit 150 is illustrated in FIG. 2 as having a single antenna 202, each antenna 202 can typically comprise several antennas or antenna elements, so that subscriber unit 150 can communicate with more than one satellite at a time. Those skilled in the art will appreciate that instead of a bank of discrete, uni-directional antennas, antenna 202 can be implemented as a single, phased-array antenna or a combination of uni-directional antennas and phased-array antennas.

Transceiver 204 is desirably a multi-channel transceiver capable of transmitting and receiving on all frequency channels in specified time slots as required by satellite-based cellular communication system 100 (FIG.1). Transceiver 204 desirably comprises an acquisition channel transceiver portion, a broadcast channel receiver portion and a traffic channel transceiver portion. The acquisition channel transceiver portion communicates on one of several acquisition channels as determined by satellite 110 and is primarily used during access protocols when a subscriber desires access to satellite-based cellular communication system 100. The traffic channel transceiver portion communicates with satellite-based cellular communication system 100 on a traffic channel assigned by satellite 110 (FIG. 1). Those skilled in the art will understand that the acquisition channel transceiver portion, the broadcast channel receiver portion and the traffic channel transceiver portion can be contained in a single unit which is capable of performing all these functions.

Transceiver 204 couples to processor 206, which controls the frequency and timing parameters upon which transceiver 204 operates. In addition, processor 206 preferably controls the power level at which transceiver 204 transmits signals. Processor 206 also couples to I/O section 230, timer 220 and memory 210. Processor 206 uses a timer to maintain the current date and time. Memory 210 includes storage devices for storing data which serve as instructions to processor 206 and which when executed by processor 206, cause subscriber unit 150 to carry out procedures which are discussed below. In addition, memory 210 includes variables, tables, and databases that are manipulated due to the operation of subscriber unit 150.

Input/output (I/O) section 230 of subscriber unit 150 is used to collect signals from a user of subscriber unit 150 and to provide outputs for the user to perceive. I/O section 230 desirably includes, for example, keypad 236 to collect dialed digits that identify an emergency service center to which an emergency call request can be directed. In addition, the I/O section 230 desirably includes power switch 242 to control the energization and de-energization of subscriber unit, send key 240 to indicate when a complete set of dialed digits has been entered, and hook switch 232. Display 208 can desirably be used to present visual information to the user, and audio alert 234 can desirably be used to provide an audible alert to the user. Display 208 can, for example, be used to present menus or lists of alternatives to a user for selection. Handset 238 can desirably be used to transform audible signals into electrical signals and vice-versa.

In addition, keypad 236 is an interface capable of receiving a request for emergency service from a user. Keypad 236 can be a conventional ten digit keypad, or may be another indicator which, when pressed or set, indicates an emergency situation. Keypad 236 is part of I/O section 230 which is coupled to processor 206. Processor 206 detects a request for emergency call and generates an emergency call request message. Processor 206 is coupled to memory 210 which desirably contains information necessary for detecting an emergency call request and generating an emergency call request message. Processor 206 is coupled to transceiver 204 which is used to transmit the emergency call request message.

While FIG. 2 illustrates a particular arrangement for a subscriber unit, those skilled in the art will understand that a different arrangement can be used. It should be understood that a subscriber unit can assume any number of different configurations, with varying functional combinations. For example, a subscriber unit could be shown with a different I/O section, or it could be shown without a timer.

Figure 3:
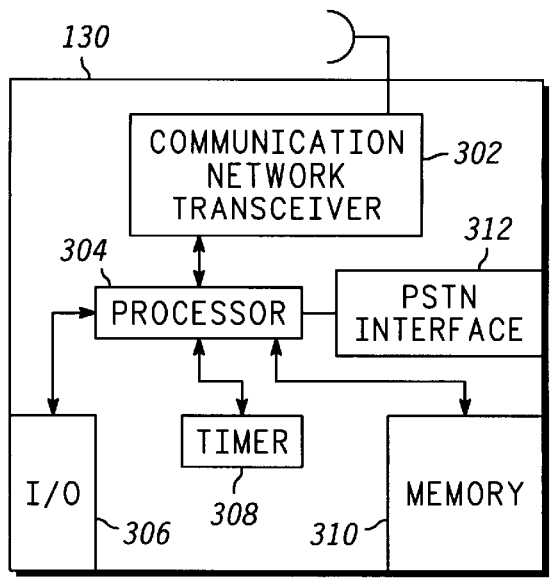
FIG. 3 shows a block diagram of a gateway in accordance with a preferred embodiment of the present invention.

FIG. 3 shows a block diagram of a gateway in accordance with a preferred embodiment of the present invention. Gateway 130 comprises communication network transceiver 302, processor 304, I/O section 306, timer 308, memory 310, and public switched telecommunication network (PSTN) interface 312. Communication network transceiver 302 transmits and receives signals over data communication links in a format compatible with satellite 110. These signals carry data messages which allow gateway to communicate with a nearby satellite, with other gateways that the gateway may be cooperating with in establishing, managing, or terminating a call, and with subscriber units that gateway 130 is currently serving.

Communication network transceiver 302 is coupled to processor 304. Processor 304 also couples to I/O section 306, timer 308, memory 310 and PSTN interface 312. I/O section 306 receives inputs from keyboards, and other input devices and provides data to display terminals, printers, and other output devices. Processor uses timer 308 to monitor real time and help maintain the current date and time. Memory 310 includes storage devices for storing data that serve as instructions to processor 304 and which, when executed by processor 304, cause gateway to carry out procedures which are discussed below. In addition, memory 310 includes variables, tables, and databases that are manipulated due to the operation of gateway 130 (FIG. 1). Gateway 130 communicates with the PSTN using PSTN interface 312.

While FIG. 3 illustrates a particular arrangement for a gateway, those skilled in the art will understand that a different arrangement can be used. It should be understood that a gateway can assume any number of different configurations, with varying functional combinations. For example, a gateway could be shown with a different I/O section, or it could be shown without a timer.

Figure 4:
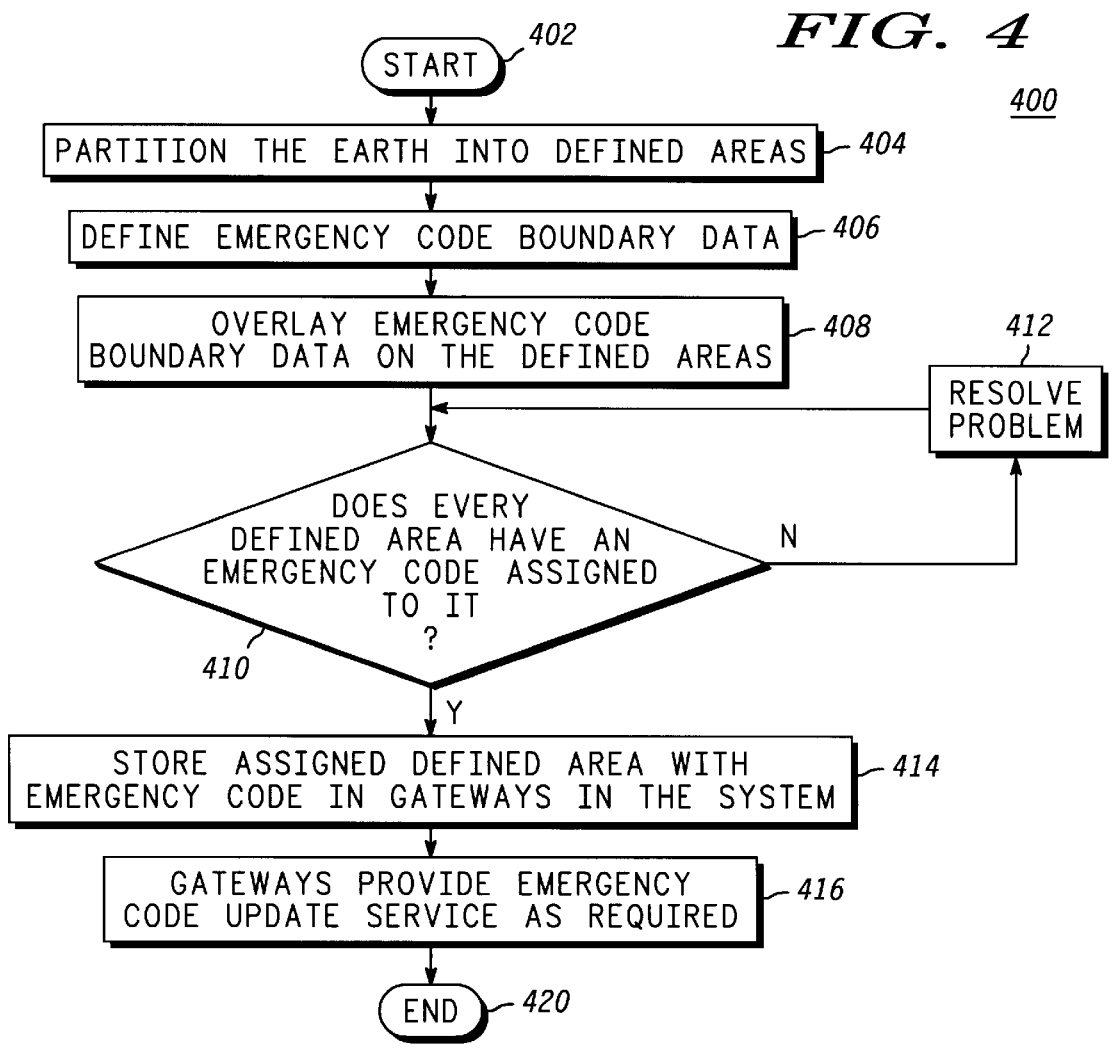
FIG. 4 shows a flow chart of a method for operating a satellite communication system to provide global emergency services for subscriber units.

FIG. 4 shows a flow chart of a method for operating a satellite communication system to provide global emergency services for subscriber units. Method 400 starts in step 402. In step 404, the surface of the earth is partitioned into defined areas. These areas can be equally spaced areas or non-equally spaced areas. In a global communication system, a defined area is one in which a subscriber unit can be located. In step 406, the emergency code boundary data is established. In this step, the boundaries are established for the different emergency codes which exist through the world. In some cases, multiple numbers map to the same areas. This is due to certain geopolitical regions requiring different numbers for different emergency services. In step 408, the emergency code boundary data is overlaid on the defined areas to obtain a correspondence between the defined area and at least one emergency code. In some cases, this cannot be done because emergency services are not available in some geopolitical regions. In step 410, a query is performed to determine if every defined area has an emergency code assigned to it. When a defined area does not have an emergency code assigned to it, method 400 branches to step 412 in which a problem resolution procedure is performed. Rules can be devised for assigning defined areas emergency codes, and exceptions must be considered. In this problem resolution procedure, problems such as those which occur when a boundary line cuts through a defined area are resolved.

When emergency codes have been assigned to all of the defined areas, method 400 branches to step 414 in which a table or database is created to store the assignment of emergency code to defined areas. The table or database is stored so that each gateway has access to the information. For example, records in the table or database could contain defined areas and assigned emergency codes. This could be a multi-level storage scheme to provide for faster searching. In step 416, the gateways provide an emergency code update service as required by subscriber units. In a preferred embodiment, the gateway determines when a subscriber unit has moved into a defined area with a different emergency code. When the gateway determines that the subscriber unit has moved into a defined area with a different emergency code, the gateway transmits new emergency codes to the subscriber unit.

Figure 5:
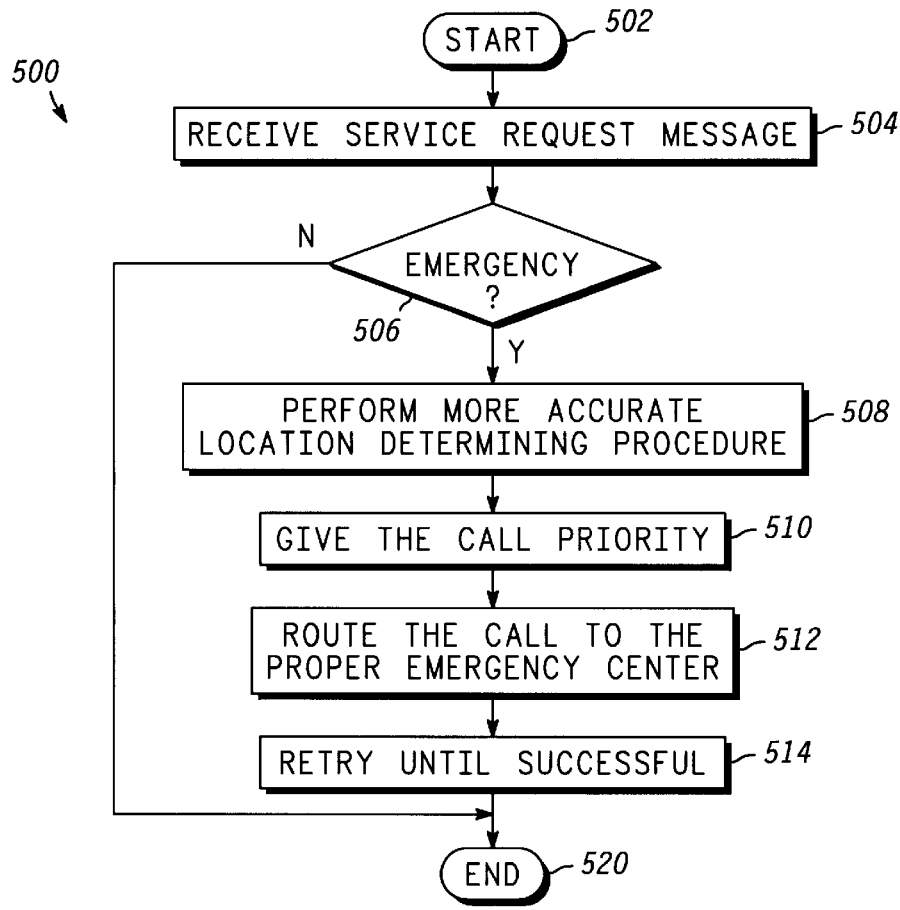
FIG. 5 shows a flow chart of a method for operating a satellite in a satellite communication system in accordance with a preferred embodiment of the present invention.

FIG. 5 shows a flowchart of a method for operating a gateway in a satellite communication system to provide global emergency services for subscriber units in accordance with a preferred embodiment of the present invention. Method 500 starts with step 502. In step 504, a gateway receives a service request message. In a preferred embodiment, the gateway is not the user's home gateway but rather a visited gateway. In alternate embodiments, the service request message could be received by the user's home gateway or by another control facility.

In step 506, a query is performed to determine if the service request message is an emergency service request message. For example, the message could be structured so that a particular portion or even a particular bit of information is used to identify the message as an emergency service request message. In a preferred embodiment, determining can include reading header information or an emergency bit contained in data packets in the message. If the service request message is not an emergency service request message, then method 500 branches to step 520 and ends.

When query task 506 determines that the service request message is an emergency service request message, then method 500 branches to step 508. In step 508, a procedure is performed a more accurate determination of the location of the subscriber unit that sent the emergency service request message. For example, this procedure is performed because the emergency service request message is an attempt to make an emergency call. When the call attempt is an emergency, the subscriber unit's location is important information.

In step 510, the call is given priority because it has been identified as an emergency. In any switching network, routing priority can be as important as access priority. In step 512, the call is routed to the proper emergency service center by the gateway. The subscriber unit is not required to perform any additional steps to ensure that the call is made. In step 514, the gateway continues to attempt to make the call until it is successful. For example, success could be achieved if the emergency service center acknowledges. Method 500 ends in step 520.

Figure 6:
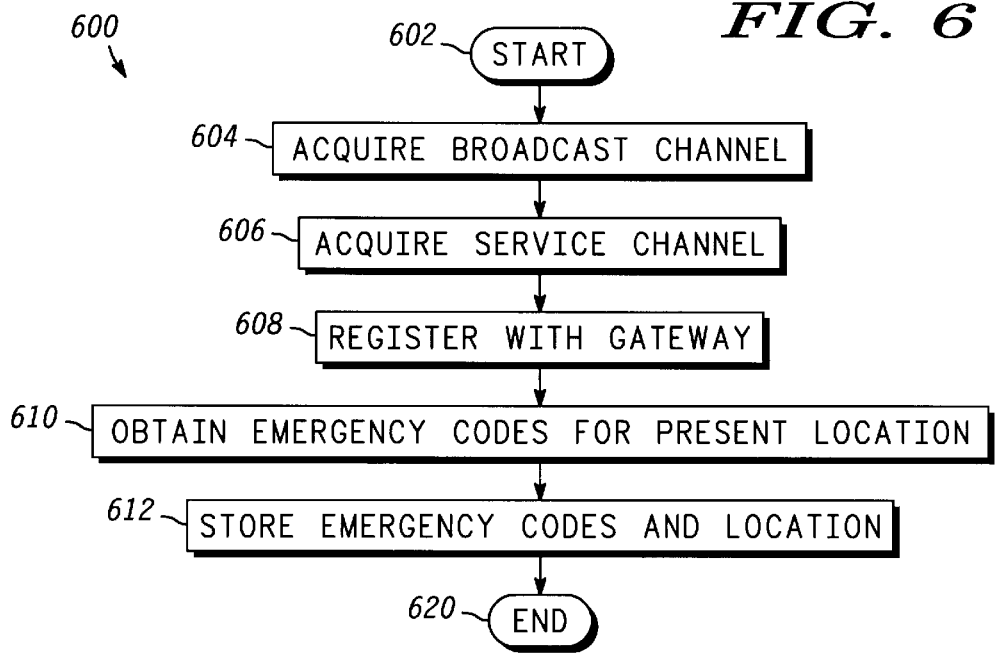
FIG. 6 shows a flow chart of a method for operating a subscriber unit in a satellite communication system to obtain emergency codes in accordance with a preferred embodiment of the present invention.

FIG. 6 shows a flowchart of a method for operating a subscriber unit in a satellite communication system to obtain emergency codes in accordance with a preferred embodiment of the present invention. Method 600 starts with step 602. For example, step 602 could be caused by an energization of the subscriber unit. In step 604, a subscriber unit acquires a broadcast channel from a satellite in a satellite communication system. Subscriber unit uses the broadcast channel to obtain information from the satellite communication system. In step 606, the subscriber unit acquires an access channel from a satellite in the satellite communication system. In step 608, the subscriber unit uses the acquisition channel to register with a gateway. In step 610, the gateway transmits emergency codes to the subscriber unit. In a preferred embodiment, the emergency codes can be new emergency codes if the subscriber unit is registering in a different area. In step 612, the subscriber unit stores the emergency code information and its current location. Method 600 ends in step 620.

Figure 7:
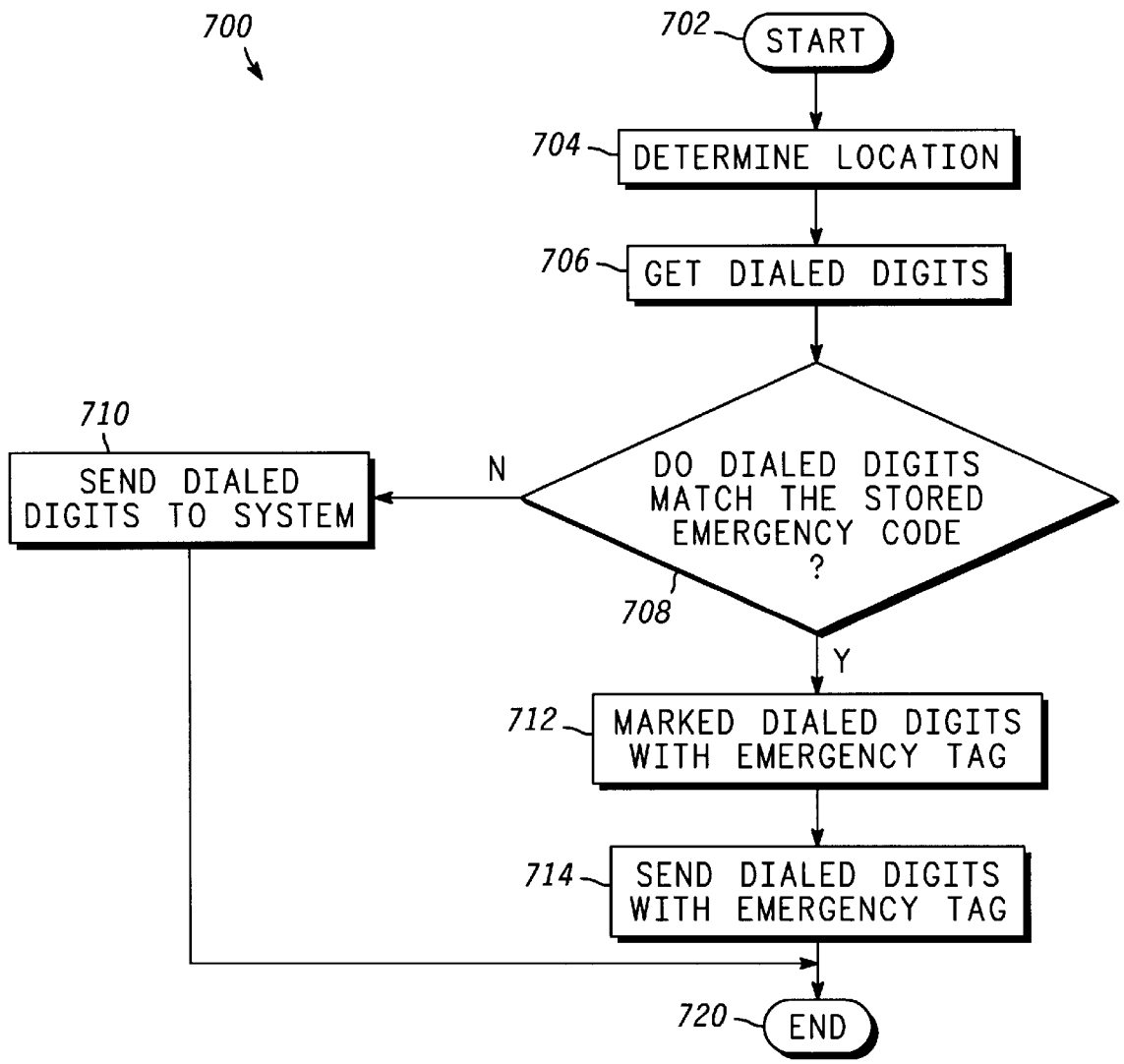
FIG. 7 shows a flow chart of a method for operating a subscriber unit in a satellite communication system to establish a call attempt as an emergency in accordance with a preferred embodiment of the present invention.

FIG. 7 shows a flowchart of a method for operating a subscriber unit in a satellite communication system to establish a call attempt as an emergency in accordance with a preferred embodiment of the present invention. Method 700 starts with step 702. For example, step 702 could be caused by an energization of the subscriber unit. In step 704, the subscriber unit determines its present location. In step 706, the dialed digits are obtained. In step 708, a query is performed to determine if the dialed digits match the stored emergency code for the present location. When the dialed digits do not match the stored emergency code, then in step 710, the dialed digits are sent to the satellite communication system without an emergency designation. For example, these call attempts could be treated as normal call attempts. When the dialed digits match the stored emergency code, then in step 712, the subscriber unit marks the message with an emergency tag. For example, a satellite system could deny access to certain subscriber units if the system was in an emergency only mode. In step 714, the emergency message with an emergency tag is sent to the satellite communication system. The emergency tag gives the message priority in the satellite communication system. In situations such as natural disasters only messages with emergency tags will be processed by the system. In addition, only subscriber units which tag their messages as emergency messages will have access to the satellite communication system. Method 700 ends in step 720.

The present invention has been described above with reference to a preferred embodiment. However, those skilled in the art will recognize that changes and modifications can be made in this embodiment without departing from the scope of the present invention. For example, while various embodiments have been described in terms of using defined areas and emergency codes, other descriptions or methods can also be employed. In addition, the present invention need not be restricted to use only in connection with a satellite-based communication system. Those skilled in the art may easily adapt the teaching of the present invention to any satellite-based or land-based communication systems which are used to send requests for emergency services. Accordingly, these and other changes and modifications which are obvious to those skilled in the art are intended to be included within the scope of the present invention.

What is claimed is:

1. A method for operating a gateway in a satellite communication system to provide emergency codes to a subscriber unit in the satellite communication system, comprising the steps of:

(a) dividing earth's surface into defined areas identified by location area codes (LACs);

(b) assigning an emergency code to each of the defined areas, the emergency code identifying an emergency service center (ESC) when emergency services are provided for a particular LAC;

(c) receiving a registration message from the subscriber unit, the registration message comprising a LAC;

(d) determining from the registration message a home gateway for the subscriber unit;

(e) determining whether the subscriber unit has moved to a defined area with an emergency code that is different than the one currently assigned to the subscriber unit;

(f) transmitting a new emergency code to the subscriber unit, when the subscriber unit has a new LAC associated with it; and (g) receiving an emergency service request message from the subscriber unit;

(h) determining a more accurate location of the subscriber unit;

(i) establishing a routing priority; and (j) routing an emergency message to an ESC.

* * * * *